E. B. ARNOLD.
WAVE FORCE UTILIZING DEVICE.
APPLICATION FILED OCT. 17, 1913.
1,290,867.
Patented Jan. 14, 1919.
2 SHEETS—SHEET 1.
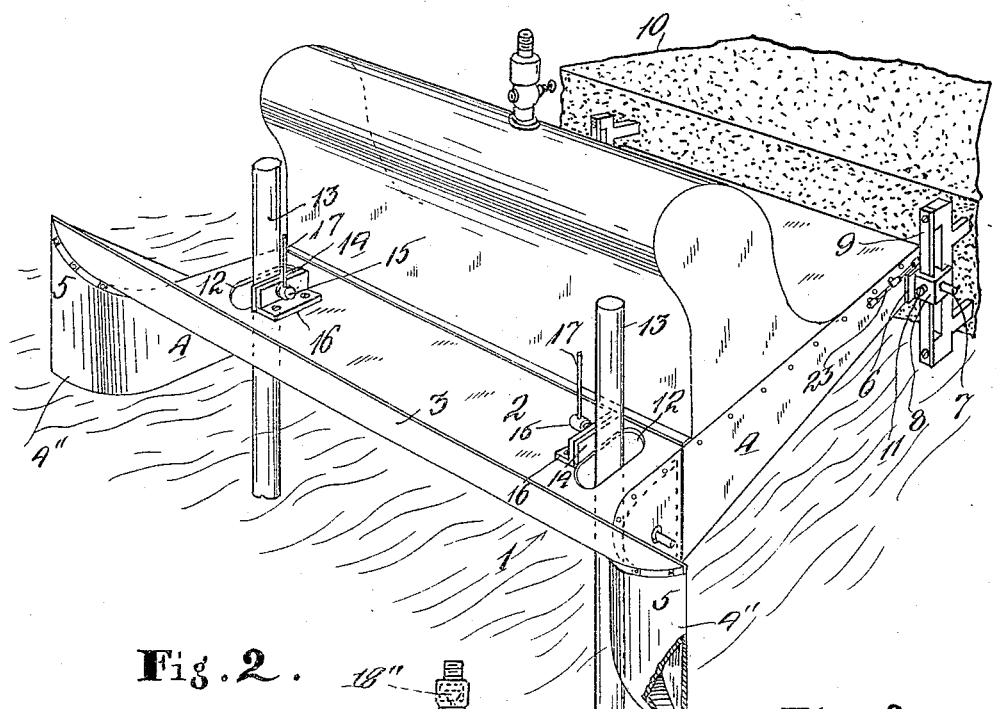
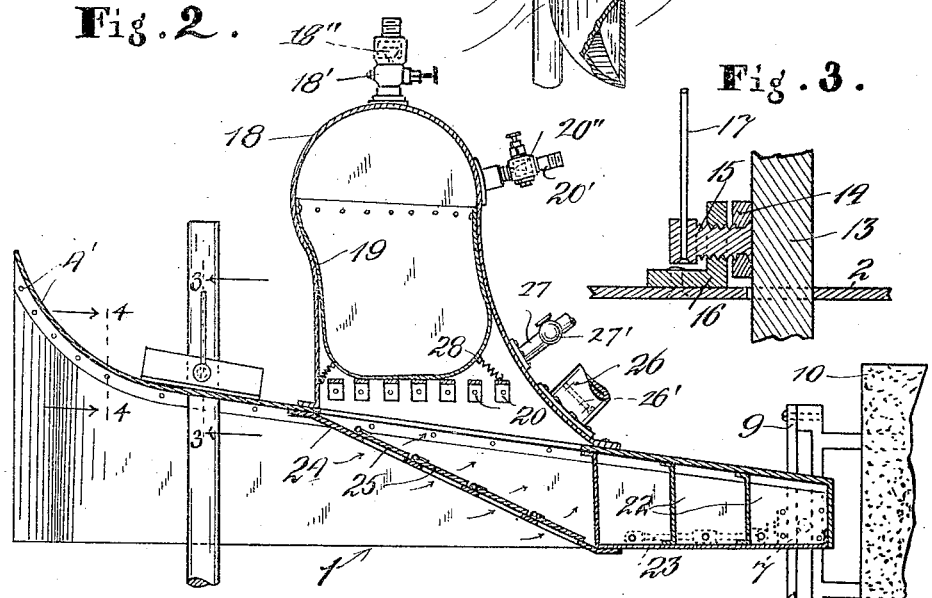
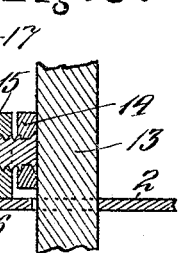
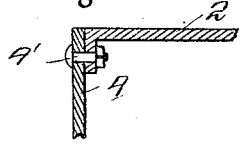
WITNESSES:
W. M. Gentle
E. Timson
INVENTOR.
Emmer B. Arnold,
by Anton Glazned
Atty.

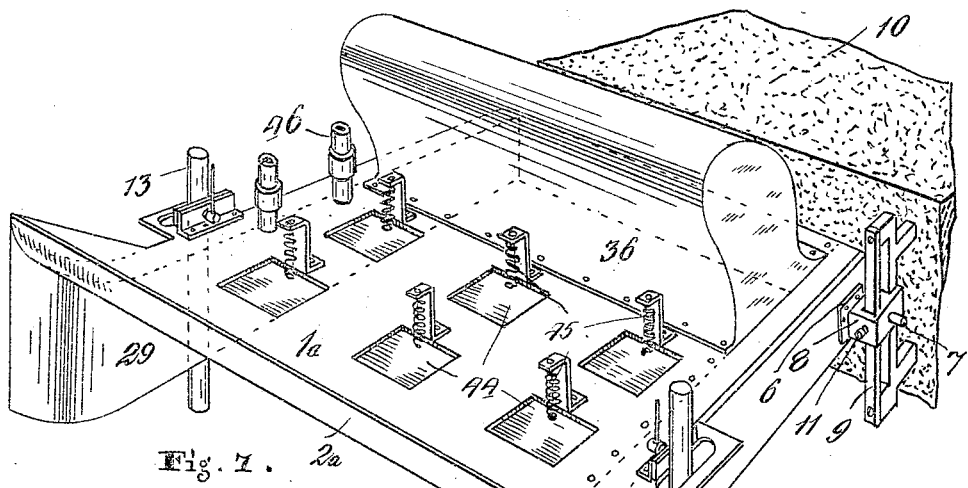
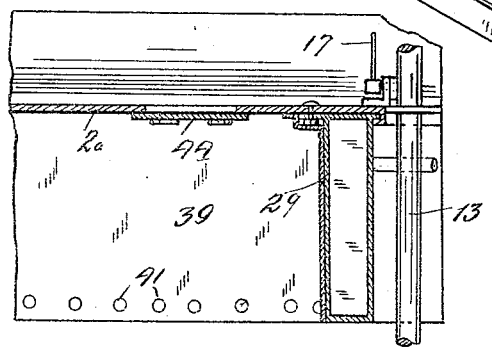
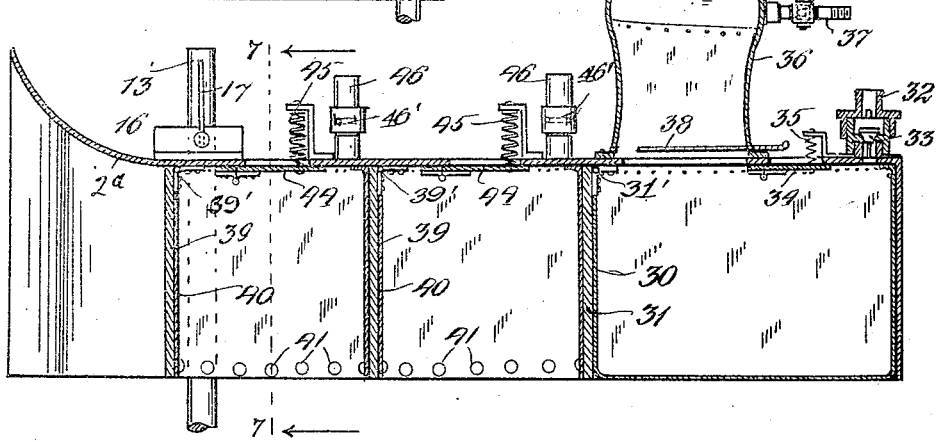

UNITED STATES PATENT OFFICE.

EMMER B. ARNOLD, OF LOS ANGELES, CALIFORNIA.

WAVE-FORCE-UTILIZING DEVICE.

1,290,867.  Specification of Letters Patent.  Patented Jan. 14, 1919.

Application filed October 17, 1913. Serial No. 795,643.

*To all whom it may concern:*

Be it known that I, EMMER B. ARNOLD, a citizen of the United States, residing at Los Angeles, in the county of Los Angeles and State of California, have invented a certain new and useful Wave-Force-Utilizing Device, of which the following is a specification.

My invention relates to a means for utilizing the force of waves, and contemplates the provision of a simple and effective means for forcing water or compressing air.

This invention further contemplates certain improvements upon my copending application which has matured into Patent No. 1,214,257 granted January 30, 1917, in that a more efficient operation, by means of a simplified construction, is produced.

The accompanying drawing illustrates the invention.

Figure 1, is a perspective view.

Fig. 2, is a vertical sectional view.

Fig. 3, is an enlarged sectional detail showing a means for holding the structure in position; the section is taken on line 3—3, Fig. 2, looking in the direction of the arrow.

Fig. 4, is a sectional view taken on line 4—4 Fig. 2 showing a fragment of the top of the structure and a fragment of one of the walls, which is removably fastened to the top.

Fig. 5, is a perspective view of a slightly modified form.

Fig. 6, is a vertical sectional view showing the flexible fluid compressing compartments, and Fig. 7, is a fragmentary section taken on line 7—7, Fig. 6, showing one of the hollow water or air receiving walls for the structure.

Referring to the drawing similar letters of reference, denoting similar parts, 1, designates a bottomless inclosure, comprising a top 2, having a preferably upwardly flaring end 3, and walls 4, whose ends flare outwardly as at 5, the walls being attached to the top 2, by bolts 4', whereby the same may be removed. The forward ends of said walls 4 may be provided with chambers 4'', for air or water, as required.

On each wall 4, is a plate 6, provided with a trunnion 7, mounted in a suitable bearing in the nature of a box 8, which is adjustably mounted on a slide 9, embedded in a concrete or other solid foundation 10. A set screw 11, serves to secure said box 8, in position of adjustment. Said trunnion pivotally supports the rear end of said structure to enable the front thereof to rise and fall with the waves, where this is desired, or the entire structure may be allowed to rise and fall with the waves by releasing the set screw 11, thus leaving the box 8, free to move on the slide.

The top 2, of said structure is provided with elongated slots 12, through which extend posts 13, to which the structure 1, is arranged to be made fast, preferably by plates 14, swiveled on the ends of screws 15, mounted in angle irons 16, which are riveted to the top 2, of the inclosure. In the end of said screws 15, are levers 17, for operating said screws to lock the inclosure on said posts 13, and hold the same at a determined level.

When the device is to be held in a rigid position for utilizing the force of waves in calm weather and normal tides, the front of the device is locked by the screws 15, referred to and the box 8, pivotally supporting the rear of the device is locked on the slide 9, by the set screw 11. Where, however, an unusual rough sea or high tide is apt to damage a rigid structure, the locking means at the front may be opened, whereby the whole structure then pivots at the rear, the weight of the device being sufficiently resistant to the waves to cause water or air to be forced therethrough.

On the top 2, of said inclosure 1, is a chamber 18, provided on the inside with a bag 19, of flexible material, the bottom of said bag normally resting on transverse bars 20. Said bag is supplied with air through pipe 20'.

The rear of said inclosure comprises compartments 22, to which water or air may be supplied, through a pipe 23, to cause the same either to sink to its lowest possible position, or to float, as may be necessary according to conditions.

Extending at an angle from the top 2, of the inclosure, to the bottom of the forward end of the compartments 22, and directly under said chamber 18, is a wall 24, provided with a plurality of valves 25, which open inwardly under the force of the waves and which prevent the escape of the water. The water entering through the valves under great force, causes a compression of the air bag 19, which materially assists after the impact of the waves in forcing the water through the outlet pipe 26, to a suitable point for subsequent usage. The air bag 19, being compressed, offers a yielding resistance to the compressing water and causes a more even flow of the water after the impact of the incoming waves.

A pipe 27, preferably furnished with a valve 27', may serve to conduct air to a suitable reservoir or place of use, simultaneously with the forcing of water through pipe 26 which is also provided with a check valve 26'. If the air in the bag 19, is desired to be used, it may be allowed to escape through the pipe 18' having a check valve 18'', in which event the air will be drawn into the bag through the pipe 20', having a check valve 20'', when the bag is returned to normal position, preferably by springs 28, though the bag may of itself assume its normal position under its own weight, where the springs are disconnected.

The structure represented by Figs. 5, 6 and 7, comprises a bottomless inclosure 1ª having hollow side walls 29, for air or water, these walls being removably fastened to the top 2ª in any suitable manner. The rear of the inclosure comprises a bag 30, suitably supported therein and attached at one end to a vane 31, hingedly secured as shown at 31' to the bottom of the top 2ª. On said top 2ª is a pipe 32, through which air compressed in said bag 30 may escape, a valve 33, being provided to prevent ingress of the compressed air back to the bag. A valve 34, normally held closed by a spring 35, is provided to permit of air being drawn into the bag when the pressure is relieved by the recession of the waves. An auxiliary air chamber 36, may be provided on the top 2ª of the inclosure, into which chamber the air from the bag 30, may be compressed and forced out through pipe 37, having a check valve 37'. A slide valve 38, may be employed to partially or completely close the opening to said auxiliary chamber 36.

Hingedly attached as shown at 39' to the underside of the top 2ª, is a plurality of vanes 39, to which are attached flexible bottomless compartments 40, held taut by suitable means, as by weights 41. Each compartment is provided with valves 44, normally held closed by springs 45, and with an outlet pipe 46, provided with a check valve 46'. Under the force of the waves, the air in these compartments is highly compressed, and the compartments have a wide latitude of movement to bring about the greatest compression of the air.

The incoming waves produce a swinging movement of the vanes 39 and 31, consequently reducing the area of the compartments formed thereby and, with the rising level of the water highly compressing the air, which escapes through the outlet pipes 46 and 32. On the recession of the waves the air is drawn into the compartments through the openings leading thereto and normally closed by valves 44 and 34.

What I claim, is:—

1. A wave force utilizing device comprising an inclosure pivotally supported at its rear end, an air chamber on said inclosure provided with a pipe to supply air thereto, and having an outlet, a wall below said chamber provided with a plurality of valves adapted to admit water to and confine water within said chamber, and means to adjustably support the forward end of said inclosure.

2. A wave force utilizing device comprising an inclosure, a pivotal support for the rear of said inclosure, a slidable bearing for said support, means to support the front end of said inclosure, a chamber on said inclosure, a container therein for a suitable fluid, and a supply pipe on said chamber for said container.

3. A wave force utilizing device comprising an inclosure having a compression chamber, a flexible bag in said chamber, a pipe to supply air to said chamber, an outlet on said chamber, an inclined wall on said inclosure having a plurality of valves arranged to be opened by incoming waves and confine water in said chamber, and a water outlet on said chamber.

4. A wave force utilizing device comprising an inclosure having an inclined wall dividing said inclosure into a wave receiving and a water confining chamber, a plurality of valves on said wall arranged to be opened by incoming waves and confine water in said chamber, an outlet on said confining chamber, a compressible bag in said chamber, an air supply pipe for said bag, and a valve controlled air outlet for said bag.

5. A wave force utilizing device comprising an inclosure having a compression chamber, and a flexible fluid containing means in said chamber.

6. A wave force utilizing device comprising an inclosure having a compression chamber, an outlet from said compression chamber, and a flexible air container in said compression chamber.

7. A wave force utilizing device comprising an inclosure pivotally supported at its rear end, and a slidable means for said pivotal support.

In testimony whereof I affix my signature in the presence of two witnesses.

EMMER B. ARNOLD.

Witnesses:
HENRY E. STORRS,
E. E. VINSON.